United States Patent
Grieve et al.

(10) Patent No.: US 8,042,631 B2
(45) Date of Patent: Oct. 25, 2011

(54) ELECTRIC VEHICLE HAVING MULTIPLE-USE APU SYSTEM

(75) Inventors: Malcolm James Grieve, Fairport, NY (US); John A. MacBain, Carmel, IN (US); Jean J. Botti, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 1285 days.

(21) Appl. No.: 11/370,285

(22) Filed: Mar. 8, 2006

(65) Prior Publication Data

US 2006/0219448 A1  Oct. 5, 2006

Related U.S. Application Data

(60) Provisional application No. 60/668,166, filed on Apr. 4, 2005.

(51) Int. Cl.
*B60L 11/18* (2006.01)
*H02J 7/00* (2006.01)

(52) U.S. Cl. ............... 180/65.21; 180/65.31; 320/109; 290/1 R

(58) Field of Classification Search ............. 180/2.1, 180/53.1, 60, 65.1, 65.21, 65.24, 65.31; 290/1 R; 429/13, 23

See application file for complete search history.

(56) References Cited

U.S. PATENT DOCUMENTS

| | | | | |
|---|---|---|---|---|
| 4,182,960 A | * | 1/1980 | Reuyl | 290/1 R |
| 4,507,720 A | * | 3/1985 | Colbrese | 363/13 |
| 5,642,270 A | * | 6/1997 | Green et al. | 363/17 |
| 5,767,584 A | * | 6/1998 | Gore et al. | 290/1 R |
| 5,845,479 A | * | 12/1998 | Nakhamkin et al. | 60/777 |
| 5,858,568 A | * | 1/1999 | Hsu et al. | 429/13 |
| 6,107,691 A | * | 8/2000 | Gore et al. | 290/1 R |
| 6,118,248 A | * | 9/2000 | Gartstein et al. | 320/107 |
| 6,380,637 B1 | * | 4/2002 | Hsu et al. | 290/1 R |
| 6,503,649 B1 | * | 1/2003 | Czajkowski et al. | 429/430 |
| 6,583,521 B1 | * | 6/2003 | Lagod et al. | 307/70 |
| 6,673,479 B2 | * | 1/2004 | McArthur et al. | 429/513 |
| 7,261,962 B1 | * | 8/2007 | Czajkowski et al. | 429/23 |
| 2004/0126635 A1 | * | 7/2004 | Pearson | 429/23 |

* cited by examiner

*Primary Examiner* — J. Allen Shriver, II
*Assistant Examiner* — Bridget Avery
(74) *Attorney, Agent, or Firm* — Thomas N. Twomey

(57) ABSTRACT

During periods of vehicle inactivity, a vehicle-based APU electric generating system may be coupled into a regional electric grid to send electricity into the grid. A currently-preferred APU is a solid oxide fuel cell system. When a large number of vehicles are thus equipped and connected, substantial electric buffering can be effected to the grid load. A vehicle-based APU can also function as a back-up generator to a docking facility in the event of power failure of the grid. Gaseous hydrocarbon is readily supplied by pipe in many locations as a commercial and residential heating fuel source, and a hydrocarbon reformer on the vehicle can be attached to the fuel source, enabling an APU to operate as a stationary power source indefinitely. An optional storage tank on the vehicle may be refueled with gaseous fuel, for example, while the battery is being electrically recharged by the grid.

24 Claims, 1 Drawing Sheet

ELECTRIC VEHICLE HAVING MULTIPLE-USE APU SYSTEM

RELATIONSHIP TO OTHER APPLICATIONS AND PATENTS

The present application claims priority from U.S. Provisional Patent Application, Ser. No. 60/668,166, filed Apr. 4, 2005.

TECHNICAL FIELD

The present invention relates to electric-powered vehicles (EVs); more particularly, to EVs having auxiliary power units (APUs) for recharging batteries in the EVs; and most particularly, to an electric vehicle having an electric battery and a solid oxide fuel cell APU wherein the fuel cell may be used for recharging the battery and also for non-vehicular uses, including supplementing a regional grid with electric power when the vehicle is not in use.

BACKGROUND OF THE INVENTION

Specialty electric vehicles (EVs) of various types are well known for indoor applications (for example, forklifts, wheelchairs, and airport people-movers for the elderly) and for short-trip outdoor use (golf carts, neighborhood electric vehicles, and handicapped scooters). Such vehicles typically are purely electric, having a motive electric motor powered by a battery storage system that is recharged by being connected to a regional electric grid or other electric source during periods of non-use of the vehicle.

Purely electric vehicles for use on open roads and highways have been shown to have credible niche markets in the USA and Europe only when the cost to the consumer is subsidized in some fashion. A key issue for future mass viability is whether technical maturity and higher volume production can meet the market-demanded price level.

EVs are well suited to short trip, low speed duty cycles in temperate climates. They are not well suited to higher mileage, higher speed, and longer trip patterns of driving in the USA, nor to operation in cold weather; however, land use, climate, and population density in many parts of the world are well-suited to EV use. For example, average vehicle speed and trip length are dramatically lower in Tokyo or Beijing, or even in London, Paris, or Mexico City, than in Detroit or Los Angeles. Vehicle attributes like top speed and peak horsepower are not likely to be so important in those foreign markets.

Electric road vehicles are highly desirable for meeting ZEV and PZEV standards, as witnessed by the success of recent trials in California. However, battery technology has been and continues to be the limiting factor in terms of cost, functionality (range), and durability of EV systems. Battery systems required to provide purely electric vehicles with a reasonable range and speed are still excessively bulky and costly. Therefore, the automotive industry has largely moved on to research and development of other approaches to provide continuous electric power to vehicles and to thereby gain the benefits of extremely low emissions and reduced fossil fuel consumption.

Because prior art road EVs, even those having very large capacity batteries, have limited range, it is of interest to provide onboard electric recharging capability. Such EVs are known in the prior art as "range extender" EVs or "hybrid" EVs. In a so-called "first generation" hybrid EV, typified by the Toyota Prius, all of the electric power used to charge the battery is generated onboard through a combination of regenerative braking and an internal combustion engine (ICE) driving an electric generator. The battery required is much smaller than in a purely electric EV. Fuel efficiency gains come from downsizing the ICE, operating the ICE at a more efficient operating point (when running), and shutting off the ICE during periods of low power demand.

One approach for a "second generation" EV, which is an evolution of the current series/parallel hybrid electric vehicle, is to increase the capacity of the battery and to allow the battery to operate in a charge-depleting mode without simultaneous recharge for a period of time, permitting short trips at low speed in pure electric mode. The battery may be recharged afterward when the vehicle is parked by being plugged into a source of power such as a regional electric grid. This then becomes a "plug-in" hybrid electric vehicle, where low speed and short trips can be substantially grid fueled and an onboard internal combustion engine (ICE) provides increased peak power and extended range for higher speed and longer trip operation. Thus the electric energy stored in the battery initially is complemented by the chemical energy stored in the ICE hydrocarbon fuel tank, typically a gasoline tank, providing a greatly extended driving range and full utility to the driver.

A disadvantage of any ICE hybrid system, however, is the level of combustion emissions characteristic of an ICE, requiring expensive and complex emission controls. Despite advances in emissions control technology, an ICE still produces gaseous emissions, including some level of carbon monoxide, and cannot be operated safely for extended periods in a structure with limited ventilation such as a closed garage. Another non-toxic but undesirable ICE emission is carbon dioxide which contributes to global warming.

Another disadvantage of an ICE hybrid system is its relatively low efficiency in terms of fuel-to-electric conversion and fuel-to-thermal conversion. This lowers the efficiency of the vehicle when the ICE is running, especially in cold weather conditions.

Another approach in a range extender EV is to use a fuel cell assembly (FC) in place of an ICE and generator. In the prior art, such a vehicle is known as a fuel cell EV (FCEV). As in the ICE/generator configuration, the FC reduces the weight and size of battery required. Significant advantages of a fuel cell assembly over an ICE/generator are that a fuel cell is essentially silent, high in efficiency, and inherently low in toxic emissions.

An example of an FCEV is the Toyota FINE-N H2 FCEV, shown at the 2003 Toyota Motor Show, which uses hydrogen directly rather than reformed hydrocarbon as the chemical fuel for the FC, thus obviating the need for a reformer and post-FC combustion. All FCEVs are series hybrids and all require some amount of battery storage for system start-up and transient response reasons.

Some developers of FCEVs use proton exchange membrane (PEM) fuel cells and are focused on fuel cell dominant systems. This requires a fuel cell of 50-100 kW peak power for a typical car or light truck and places severe demands on fuel cell start-up and transient response. Such a large fuel cell is clearly a substantial cost challenge using present-day technology. Also, expectations of 15 year battery life for Ni metal hydride (NiMH) batteries in Toyota's existing hybrid vehicles suggest that a more battery-dominant FCEV is practical. The Toyota FINE-N H2 FCEV concept vehicle appears to be battery-dominant which, due to regenerative braking and operating the fuel cell in a high efficiency window, explains the very high range of 500 km on a tank full of compressed $H_2$.

Extending the range of a PEM FCEV requires onboard generation and storage of hydrogen. A serious problem in the art is that PEM fuel cells are intolerant of CO in the hydrogen fuel stream, such as is generated by a typical hydrocarbon catalytic reformer. Thus, generating hydrogen onboard by reforming hydrocarbons requires a large, complex, multi-stage reformer and gas cleanup system to make the $H_2$ of sufficient purity to run the PEM fuel cell. Further, the cost, size, transient response, and start-up time realities of such a PEM reformer make a buffer of stored $H_2$ essential, adding further cost and complexity. For these reasons, a PEM hybrid vehicle is ill-suited for range-extended operation by reforming hydrocarbons onboard.

A solid oxide fuel cell (SOFC) is another known class of fuel cell capable of utilizing a mixed fuel containing both hydrogen and carbon monoxide generated by a simple hydrocarbon reforming process. At the high temperature conditions pertaining within an SOFC, not only $H_2$ but also CO and residual light hydrocarbons may be consumed in the fuel cell anode. Further, the exhaust of an SOFC is hot and still rich in hydrogen (known in the art as "syngas") whereas the exhaust of a PEMFC is relatively cold and of little additional use. Syngas can be used for a variety of purposes, for example, for enhanced combustion and aftertreatment in an ICE; for recirculation into the reformer to permit highly efficient endothermic reforming; or for combustion directly to yield additional high-quality (high-temperature) heat for other uses. The heat can be used for premium vehicle heating and accelerated engine and catalyst warm-up and/or to drive a bottoming cycle such as a gas turbine (GT) or expander to recover additional power.

As an auxiliary power unit (APU) in a vehicle, an SOFC APU can extend the operating range up to 400-650 km or greater, depending upon the size of the fuel tank. Because "waste" heat is readily available, an SOFC EV may operate in cold climates without the compromise to range and efficiency typical of PEM EVs. Further, an SOFC is especially attractive as a range extender because of the efficiency of heat recovery for HVAC functions.

An especial advantage of SOFC system in a vehicle is that it represents an independent source of electricity, syngas, and high-quality heat, all of which may be used for non-vehicular purposes during periods when the vehicle is parked and out of service. What is needed in the art is a method and apparatus for utilizing those properties to advantage during vehicle shutdown periods after the vehicle battery is fully recharged by the SOFC and/or is plugged into a regional electric grid for recharging. Such usage can substantially increase the cash flow rate of return of the automotive investment in an SOFC system.

It is a principal object of the present invention to utilize a vehicle-based APU system, and preferably an SOFC APU system, for non-vehicular uses during periods of shutdown of the vehicle.

SUMMARY OF THE INVENTION

Briefly described, during periods of vehicle inactivity, a vehicle-based APU electric generating system may be coupled into a regional electric grid through a grid outlet at a docking facility, such as residence, place of business, or truck stop, either independently of the vehicle of through the vehicle's battery, and may be thus operated to send electricity into the grid, reducing the net metered electricity for that outlet. A currently-preferred APU is a solid oxide fuel cell system. Preferably, the vehicle's battery has high power and low impedance, such as is a characteristic of lithium ion (LI) batteries, which is very attractive for rapid, shallow charging and discharging cycles. When a large number of vehicles are thus equipped and connected, a very substantial electric buffering can be effected to the grid load, thus reducing the need for excess grid capacity wherein fossil-fueled generating stations are kept spinning at essentially no load (known in the art as "spinning losses") so that they can respond immediately to second-by-second fluctuations in electricity demand. The high efficiency of an SOFC at light load and the potential to use high-quality waste heat for building HVAC functions make the effective "spinning loss" of a hot, standby SOFC APU very low when compared to the spinning loss of central power stations. Through a communications network and control system, the SOFCs from some vehicles can be automatically on grid-standby and selectively commissioned to supply the regional grid with electricity, based on being still hot from a recent vehicle drive cycle, whereas the SOFCs in other vehicles, connected to the grid but powered down, can be started up automatically on short notice by the network and control system to supplement the grid during expected seasonal and diurnal peaks in grid demand.

A vehicle-based APU, be it ICE, PEM, or SOFC, can also function as a back-up generator to a docking facility in the event of power failure of the grid. Such use can be extremely valuable in areas such as Florida and elsewhere where power failures from storm activity are common and sometimes extended, or to areas accessible by road where power from a regional grid cannot be provided practically, such as wilderness cabins or homesteads in northern Canada and Alaska.

Additionally, a docking facility such as a residence, business or truck stop may be supplied via a storage tank or supply system with hydrocarbon fuel, either in liquid form such as gasoline, kerosene, or diesel, or a gaseous hydrocarbon such as methane, ethane, propane, butane, isobutane, natural gas, and combinations thereof. Gaseous hydrocarbon is readily supplied by pipe in many locations as a commercial and residential heating fuel. The hydrocarbon reformer on board the vehicle can be attached directly to the fuel source via a metering valve, enabling an SOFC to operate as a stand-alone stationary power source indefinitely. In addition to connecting the vehicle-based APU to such a hydrocarbon source, an optional gas fuel storage tank on board the vehicle may be refueled with gaseous fuel, for example, while the battery is being electrically recharged by the grid outlet.

In addition to the fuel and electrical connections described above, heat may be transferred from the SOFC to the building or facility to which the system is docked. This may be, for example, by ducting exhaust from the SOFC through a heat exchanger which transfers heat to air or a fluid (such as water).

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
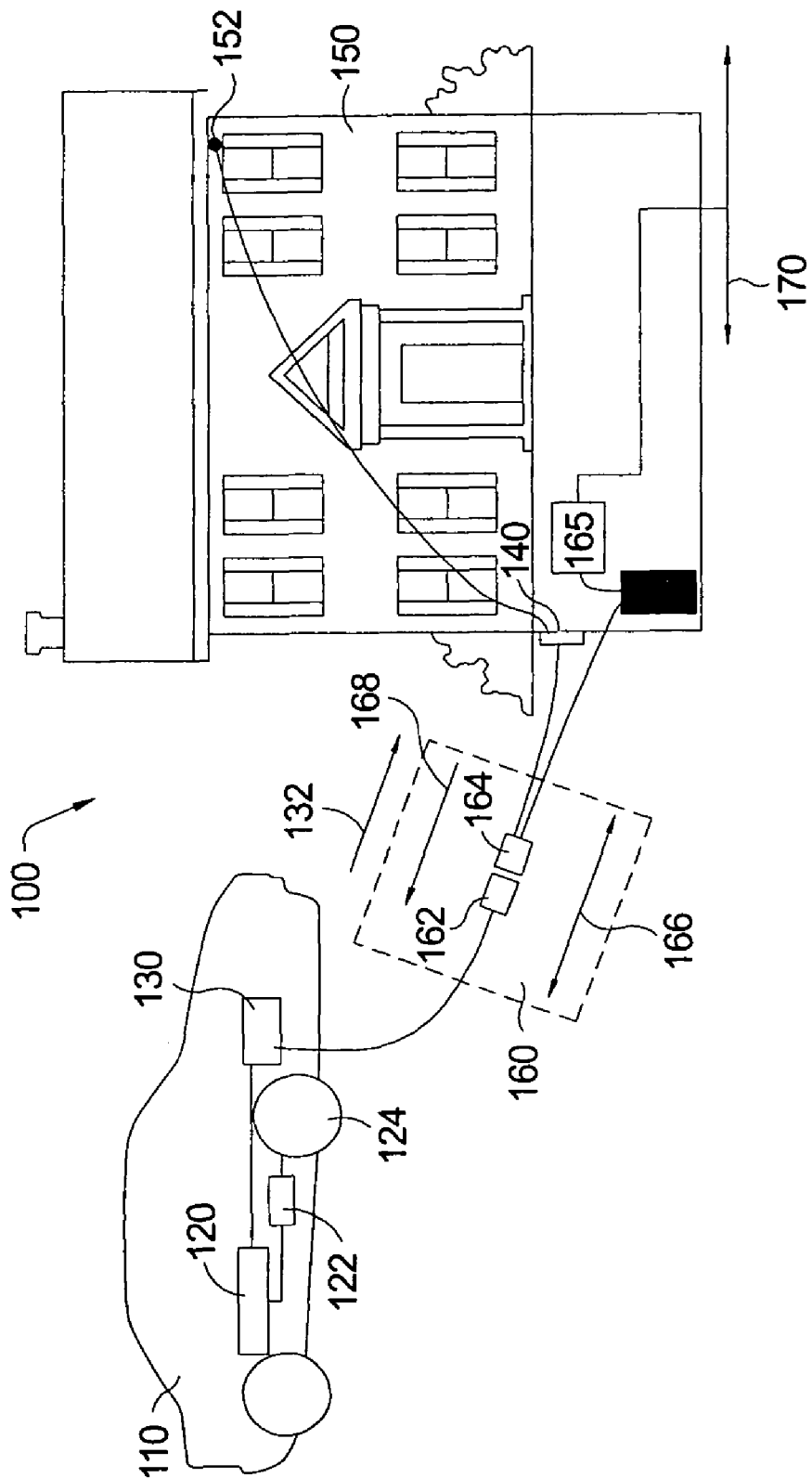
FIG. 1 is a schematic drawing showing an electric vehicle in accordance with the invention connected to an electric power grid, a source of hydrocarbon fuel, and a stationary heat sink such as a building.

The invention covers strategies for non-vehicular uses of a plugged-in hybrid vehicle having an onboard rechargeable electrical energy source, such as a battery, and an onboard APU, preferably an SOFC system.

Referring to FIG. 1, a first embodiment 100, includes a hybrid electric vehicle 110 and stationary structure 150, for example, a residence, office, shopping center, truck stop, parking lot docking station, or other structure, electrically connected to a regional grid 152. Vehicle 110 includes one or more batteries 120, preferably low-impedance batteries such as nickel metal hydride or lithium ion batteries, as its primary source of energy for powering an electric motor 122 connected to wheel 124 for vehicle propulsion. Batteries 120 may be recharged by being plugged into an outlet 140 of structure 150 connected to regional grid 152 when the vehicle is stationary or by APU 130 (preferably an SOFC or optionally by an onboard ICE/generator or PEM) for recharging the batteries 120 when vehicle 110 is underway. By recharging the batteries during vehicle use, APU 130 extends the driving range of the vehicle and may also be used, in part, to propel the vehicle in parallel with batteries 120 in order to extend peak power.

Fuel to operate an SOFC APU when the vehicle is in motion is derived from hydrocarbon fuel (not shown) stored on the vehicle, such as gasoline, diesel fuel or ethanol, after being reformed into hydrogen through the use of an onboard reformer (not shown) as is well known in the fuel cell arts. The electrical energy produced by the APU is used to power electric accessories and recharge batteries 120 when vehicle 110 is moving. A SOFC APU also produces high grade waste heat 132 in addition to the power for recharging the batteries.

Stationary structure 150, in accordance with the invention, also includes docking station 160 for conveniently connecting vehicle 110 to regional grid 152 for the purposes which will now be described.

Docking station 160 includes vehicle connector 162 for being matingly connected to station connector 164. Connectors 162,164 include bi-directional electrical connection 166 for permitting electrical power to be selectively received from grid 152 by batteries 120 or to be selectively delivered to grid 152 from batteries 120 and/or APU 130 when the connection is made, via outlet 140. Thus, during periods when the regional grid is short on power, additional power may be supplied to the grid from APU in connected vehicle 110 and other similarly connected vehicles at other docking stations (not shown). Power may also be received by the docked vehicle from the grid to recharge the batteries or to be used by the vehicle 110 for electrical accessories (not shown).

In APU discharge mode, power passing from APU 130 to grid 152 may pass either through or around batteries 120. In battery charge mode, power passing from grid 152 to batteries 120 may pass either through or around APU 130.

It will be obvious to those of skill in the art that electric power passing between vehicle 110 and grid 152 must be conditioned in known fashion through bi-directional electrical connection 166 to provide electrical compatibility, as vehicle 110 and batteries 120 typically operate on direct current whereas grid 152 utilizes alternating current.

Preferably, system 100 further includes a controller 165 which, in conjunction with communications network 170, controls receipt and delivery of the electrical power from the connected vehicles by the regional grid to optimize the efficiency of system 100. For example, network 170 can receive a combination of internet, global position system, or wireless technology to monitor and communicate vehicle and structure status (SOFC temperature, vehicle charging current, the electric and thermal loads of the stationary structure, the batteries' state of charge, anticipated user needs of the vehicle) and network commands (requested power, grid synchronization and connection state) to control the operation of system 100. When required, the network/controller is capable of starting up SOFCs at selected locations from a cold state. In a situation where the SOFC is inherently hot from a recently completed drive cycle, the network/controller 165/170 can interrogate the state of each of a plurality of vehicles 110 upon docking of each vehicle and can selectively and preferentially use only those connected SOFCs which are already at operating temperature, thereby avoiding the need to consume energy in starting up cold SOFCs except in the most severe grid peaks. Further, since a fuel and air delivery system for the SOFC may be designed so that only a small amount of fuel is needed to maintain the temperature of the SOFC at a hot, stand-by condition, the network can select which SOFCs are needed to be kept at hot stand-by based on current and predicted grid power needs and the current and predicted number, location and state of the plugged in vehicles/SOFCs. Thus, the network/controller need keep only as many SOFCs at hot stand-by as are necessary to meet the anticipated peak load and can select the method of keeping these SOFCs hot based on economics and system needs for both electrical and thermal power.

Since the exhaust of an SOFC is clean and at a relatively high temperature (300-500° C.), waste heat 132 exhausted from the SOFC of a docked vehicle can be ducted over a heat exchanger (not shown) to provide useful heat to the stationary structure. This heat recovery may be effected during operation, stand-by, or shutdown of the APU. Network/controller 165/170 can be called upon to optimally match the electrical needs of grid 152 with the thermal needs of stationary structure 150. If additional electrical power from the SOFCs is needed by the grid, certain SOFCs can be selectively turned on and their power output to the grid managed to minimize cost and emissions from the SOFCs by operating at their optimal points to meet the electric demands of the grid and thermal demands of the stationary structure. Conversely, at times when the electric demands placed on the regional grid are low, SOFCs can be selectively shut-off and the thermal needs of those stationary structures can be supplied electrically from the grid to power heat pumps, resistive heating units, etc; or, if the owner chooses, the thermal needs of the stationary structure can be supplied entirely by the SOFC.

Docking station 160, through connectors 162,164 or through a separate connector, may be also be provided with a one-directional fuel connection 168. When vehicle 110 is docked to stationary structure 150, fuel connection 168 allows the use by the SOFC of fuel available at stationary structure 150, for example, natural gas or propane, and allows for the hydrocarbon fuel already stored in the vehicle to remain in the tank for future over-the-road use. In instances where the SOFC of a docked vehicle is run on the hydrocarbon fuel stored in the tank, controller 165 may be used to monitor the level of tank fuel and to prevent the tank fuel from dropping below a desired level by switching the SOFC fuel to a stationary structure's fuel supply.

While the invention described includes the use of a controller 165 that would optimize the needs and efficiencies of the regional grid 152, it is understood that the controller could similarly be used to optimize the needs of the particular stationary structure 150. For example, the controller could allow for the prioritization of SOFC electrical output when such output is a more economical source than from the grid or for the prioritization of the use of the SOFC's waste heat in place of the use of heating units powered by the regional grid or other energy/power source.

While the invention described preferably uses an onboard SOFC as a source of auxiliary power (APU) for the grid, it should be understood that other sources of onboard auxiliary power for the grid, such as PEM fuel cells, generators powered by ICEs (spark ignition; compression ignition), or microturbine technology may be plugged into the grid and/or plugged into a household fuel source through the docking system disclosed in accordance with the invention. In addition, it should be understood that the network/controller as disclosed herein can be used similarly to control the receipt and delivery of supplemental electricity from other vehicle mounted auxiliary power sources (not shown) such as other types of fuel cells, internal combustion engines, turbines, and generators. Further, it should be understood that the recovery of exhaust heat from such other sources of auxiliary power, and the communication of that heat through the docking system to the stationary structure, is fully contemplated by this invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An automotive vehicle comprising:
    a) at least one motive electric motor;
    b) a rechargeable electrical energy source for energizing said motive electric motor;
    c) an auxiliary power unit (APU) for recharging said electrical energy source when said vehicle is in automotive use; and
    d) a controller,
    wherein said vehicle includes a connector for connecting said vehicle to a stationary structure for supplying electric power from said APU to said stationary structure when said vehicle is automotively non-operational,
    wherein said stationary structure is connected to a regional electric supply grid and wherein said APU is connectable to said regional electric supply grid via said stationary structure, and
    wherein said controller is connected to said regional electric supply grid and to said APU, said controller being configured to maintain said APU in a hot stand-by mode and to bring said APU into electrical connection with said regional electric supply grid when said APU is needed to partly satisfy a power requirement of said regional electric supply grid.

2. A vehicle in accordance with claim 1 wherein said APU is selected from the group consisting of solid oxide fuel cell, proton exchange membrane fuel cell, and internal combustion engine and generator.

3. A vehicle in accordance with claim 1 wherein said rechargeable electrical energy source includes at least one electric battery.

4. A vehicle in accordance with claim 1 wherein said stationary structure is selected from the group consisting of a residence, office, shopping center, truck stop, parking lot docking station, and combinations thereof.

5. A vehicle in accordance with claim 1 wherein said stationary structure includes a docking station for said vehicle APU.

6. A vehicle in accordance with claim 1 wherein said APU is connectable to said regional electric supply grid via said rechargeable electrical energy source in said vehicle.

7. A vehicle in accordance with claim 1 wherein said APU is connectable to said regional electric supply grid independently of said rechargeable electrical energy source in said vehicle.

8. A vehicle in accordance with claim 1 wherein said APU is operable to supply syngas for non-automotive functions in said vehicle, said stationary structure, or combinations thereof.

9. A vehicle in accordance with claim 1 wherein said APU is operable to supply heat for non-automotive functions in said vehicle, said stationary structure, or combinations thereof.

10. A vehicle in accordance with claim 1 wherein said APU is selectively operable in parallel with said electrical energy source to supply electricity directly to said motive electric motor as required to meet vehicle operating demands.

11. A vehicle in accordance with claim 1 wherein said vehicle is adapted to be connected to a hydrocarbon fuel supply when said vehicle is automotively non-operational.

12. A vehicle in accordance with claim 3 wherein said electric battery is characterized by having low impedance.

13. A vehicle in accordance with claim 12 wherein said battery includes an electric system selected from the group consisting of lithium ion and nickel metal hydride.

14. A vehicle in accordance with claim 11 wherein said hydrocarbon fuel supply is selected from the group consisting of a storage tank and a supply system.

15. A vehicle in accordance with claim 11 wherein said hydrocarbon is a gas at standard temperature and pressure.

16. A vehicle in accordance with claim 11 wherein said hydrocarbon is selected from the group consisting of methane, ethane, propane, butane, isobutane, natural gas, and combinations thereof.

17. A vehicle in accordance with claim 11 further comprising a hydrocarbon reformer,
    wherein said hydrocarbon reformer is connected to said hydrocarbon fuel supply, such that said APU may be operated therefrom indefinitely.

18. A vehicle in accordance with claim 11 wherein said vehicle further comprises an onboard hydrocarbon storage tank, and wherein said hydrocarbon storage tank is connectable to said hydrocarbon fuel supply for supplying a portable amount of gaseous hydrocarbons for fueling said APU.

19. A method for entering electric power into a regional electric power grid, comprising the steps of:
    a) providing an automotive vehicle having at least one motive electric motor, a rechargeable electrical energy source for energizing said motive electric motor, and an auxiliary power unit (APU) for recharging said electrical energy source at least when said vehicle is in automotive use;
    b) allowing said vehicle to park adjacent a power outlet from said regional electric power grid;
    c) allowing said APU to connect to said power outlet;
    d) providing a controller connected to said regional electric power grid and to said APU;
    e) operating said APU to generate electricity;
    f) determining a power requirement of said regional electrical power grid; and
    g) maintaining said APU in a hot stand-by mode and bringing said APU into electrical connection with said regional power grid when said APU is needed to partly satisfy the determined power requirement.

20. A method in accordance with claim 19 wherein said connecting step is performed around said rechargeable electrical energy source.

21. A method in accordance with claim 19 wherein said connecting step is performed through said rechargeable electrical energy source.

22. A method for entering electric power into a regional electric power grid, comprising the steps of:
   a) providing a plurality of automotive vehicles, each of said vehicles having at least one motive electric motor, a rechargeable electrical energy source for energizing said motive electric motor, and an auxiliary power unit (APU) for recharging said electrical energy source when said vehicle is in automotive use, defining a plurality of APUs;
   b) allowing each of said respective vehicles to park adjacent a respective power outlet from said regional electric power grid;
   c) allowing each of said respective APUs to connect to said respective power outlet;
   d) providing a controller connected to said regional electric power grid and to each of said plurality of APUs;
   e) operating at least one of said plurality of APUs to generate electricity;
   f) determining a power requirement of said regional electrical power grid; and
   g) maintaining in a hot stand-by mode at least one of said plurality of APUs to be brought into electrical connection with said regional power grid when said APU is needed to partly satisfy the determined power requirement.

23. A method in accordance with claim 22 comprising the further step:
   energizing additional of said plurality of APUs as needed to partially meet said determined power requirements.

24. A method in accordance with claim 23 comprising the further steps of:
   a) determining which of said plurality of APUs is thermally ready for operation; and
   b) preferentially selecting at least one of said thermally ready APUs in said energizing step.

* * * * *